US005194206A

United States Patent [19]

Koch et al.

[11] Patent Number: 5,194,206

[45] Date of Patent: Mar. 16, 1993

[54] PROCESS FOR THE MANUFACTURE OF CEILING TILE

[75] Inventors: John D. Koch, Greenwood; Mark R. Glassley, Greensburg; Richard N. Cunningham, Greenwood; C. F. Owen, Meadowview, all of Ind.

[73] Assignee: Knauf Fiber Glass, GmbH, Shelbeyville, Ind.

[21] Appl. No.: 415,588

[22] Filed: Oct. 2, 1989

[51] Int. Cl.[5] .......................... B27N 3/18; B28B 5/04; B29C 43/06; D21B 1/04

[52] U.S. Cl. .................................. 264/115; 162/225; 162/226; 264/118; 264/119; 264/122; 264/145; 264/160; 264/162; 264/163; 264/297.7; 264/319; 264/DIG. 31; 264/DIG. 53; 264/DIG. 69

[58] Field of Search ............... 264/118, 119, 112, 115, 264/120, DIG. 31, 145, 160, 162, 163, 297.7, 297.8, 297.9, 333, DIG. 69, DIG. 53, DIG. 32, 66, 122, 319; 162/222, 223, 225–227; 425/219, 220

[56] References Cited

U.S. PATENT DOCUMENTS 943,971 12/1909 Hackett .............................. 425/219
1,206,553 11/1916 Lewis ............................ 264/313 X
1,780,623 11/1930 Loetscher .......................... 162/223
2,550,465 4/1951 Gorski .................... 264/DIG. 53 X
2,664,406 12/1953 Armstrong ............ 264/DIG. 53 X
2,737,997 3/1956 Himmelheber et al. ........ 264/112 X
2,744,848 5/1956 Mottet ............................ 264/119 X
2,790,464 4/1957 Stephens et al. ....... 264/DIG. 53 X
3,166,617 1/1965 Munk ............................ 264/313 X
3,243,340 3/1966 Cadotte .......................... 162/225 X
3,246,063 4/1966 Podgurski .......................... 264/112
3,376,189 4/1968 Nystrom .......................... 162/225 X
3,894,134 7/1975 Williams ........................ 264/313 X
4,105,383 8/1978 Hanson .......................... 425/219 X
4,210,692 7/1980 Bohme et al. ............... 162/164.1 X
4,248,664 2/1981 Atkinson et al. ........... 162/181.1 X
4,311,554 1/1982 Herr .............................. 162/225 X
4,400,148 8/1983 Lawrence et al. ............... 264/37 X
4,469,656 9/1984 Ishii ................................ 264/119 X
4,495,119 1/1985 Chung .................................. 264/37
4,511,328 4/1985 Ramge et al. .................... 432/72 X
4,613,627 9/1986 Sherman et al. .................. 264/50 X
4,666,648 5/1987 Brittain ............................... 264/145
4,758,148 7/1988 Jidell .................................. 425/219
4,853,024 8/1989 Seng ................................ 432/27 X
4,892,695 1/1990 Bainbridge et al. ................ 264/119
4,927,579 5/1990 Moore .................. 264/DIG. 53 X
4,950,444 8/1990 Deboufie et al. .............. 264/118 X
5,019,171 5/1991 Hanson, Jr. et al. ............ 432/72 X

*Primary Examiner*—Karen Aftergut
*Attorney, Agent, or Firm*—Baker & McKenzie

[57] ABSTRACT

A process for using shredded scrap or virgin fiber glass in combination with starch, water and other components to make ceiling tiles. The tiles are made by initially preparing a mixture of water, starch, boric acid and fire clay. That initial mixture is then heated to form a gel. Fiber glass is then added to the gel to form a pulp. The pulp is fed into trays to form slabs. The slabs are dried and finished into tiles.

6 Claims, 2 Drawing Sheets

PROCESS FOR THE MANUFACTURE OF CEILING TILE

BACKGROUND AND SUMMARY OF THE INVENTION

This invention relates to a method and apparatus for making acoustical tile utilized primarily in ceiling construction. In particular, the method and apparatus for this invention produce an improved cast ceiling tile which has uniformity of density.

While a large variety of formulations may be used, cast ceiling tiles are generally made with a combination of fiber material and a binder, preferably a starch binder. An example of a typical prior art process is shown and described in U.S. Pat. No. 3,246,063 (the '063 patent). The '063 patent describes a process in which a composition of granulated mineral wool and a binder is deposited in a tray which has been lined with a foil sheet. The binder of the '063 patent is an amylaceous starch which, when mixed with water and mineral granulated wool, is placed on a tray in a layer. The composition is subsequently leveled with a reciprocating screed bar. The composition is then oven-dried into slabs and cut into tiles.

A substantial difficulty with the process shown in the '063 patent relates to the density of the final product. Density is an important consideration from the standpoint of structural integrity and strength, and because of thermal and acoustical considerations. The problem of achieving a uniform density relates to the manner in which the uncured composition is deposited in trays. A quantity of fluid uncured mixture is poured into a box which has an open bottom. Trays are placed on a conveyor and moved horizontally under the box. Generally, the opening of the bottom of the box is approximately the same width as the tray. When the tray moves past the opening in the box, the fluidized mixture or pulp fills the tray, and one edge of the box scrapes the surface of the filled tray to a given height. However, at the outside edges of the tray, the flow of pulp is inhibited by frictional contact with the sides of the box which are parallel to the direction of movement of the tray. The slower flow of pulp at the edges creates openings or fissures in the pulp as the tray moves out from under the box. Such fissures and open areas tend to weaken the outer edges of the tiles. The resulting inconsistencies in density have consequences which relate to the machinability, as well as the appearance of the tiles. Inconsistency in tile density may also have consequences relating to the porosity of the tile, which may be important in applications where ventilation systems rely on the tile material to direct air flow.

A wide variety of formulations can be used to manufacture starch-based ceiling tiles. Consistency of the tile material is extremely important, primarily because the tiles must have a uniform surface texture. Even minor variations in surface texture may be obvious from tile to tile, making a ceiling unattractive.

The '063 patent indicates that granulated mineral wool should be used as a primary component for making ceiling tiles. Mineral wool, i.e. spun or blown rock or slag, has proven satisfactory for many years as the primary component for ceiling tiles. However, as construction techniques have changed over the years, there has arisen a need for improvement in thermal and acoustical values, as well as improvement in fire resistance.

There has also been a need for finding ways to use fiber glass by-products, such as trimmings which result from the manufacture of fiber glass pipe, duct board, insulation boards, batts and blankets and the like.

Therefore, an object of the present invention is to provide a method for producing ceiling tiles which have improved properties of thermal resistance, acoustical insulation, and fire resistance, while retaining, or in some instances providing improved mechanical and aesthetic properties as compared with tiles made with prior art materials.

Another object of the present invention is to provide a ceiling tile which utilizes material which would otherwise be waste.

A further object of the present invention is to provide an economical and efficient method of producing ceiling tiles utilizing fiber glass.

Yet another object of the present invention is to provide a ceiling tile which has excellent thermal, acoustical, fire protective, mechanical and aesthetic properties.

It is another object of the present invention to provide a method for producing ceiling tiles which have uniform density.

It is another object of the present invention to provide an apparatus for making ceiling tiles with uniform density.

It is a further object of the present invention to provide a method for making ceiling tiles with uniform surface texture.

Another object of the present invention is to provide an apparatus for making ceiling tiles which have uniform surface texture.

Yet another object of the present invention is to provide a machine and method for depositing a layer of pulp so that when it is shaped and subsequently rolled with a roller, the layer has a substantially uniform density.

Still a further object of the present invention is to provide a ceiling tile which has uniformity of both density and texture.

These and other objects of the present invention are achieved in a process which includes the preparation of a starch-based gel comprised of a mixture of starch, water, clay, and boric acid, to which is added a silicone emulsion. The mixture is heated to and held at about 204° F. for about two hours. Once the mixture has been prepared, fiber material may be added. The fiber material can comprise virgin or scrap fiber glass, the scrap being from products which are the by-product of manufacturing other fiber glass products. However, the fiber glass should be shredded to a size sufficient so that when the fiber and gel are mixed into a pulp, the pulp can be pressed through a screen with approximately ½" openings.

After mixing the fiber and gel to form a pulp, the pulp is then deposited in trays to form slabs or layers. A conveyor is used to carry a series of trays underneath a pulp feeder box. The trays may, or may not, be lined with a flexible backing. As the trays move underneath the feeder box, pulp comprised of an aqueous mixture of starch and fibrous material is deposited in the trays. Because the upper exposed surface of the pulp layer will eventually be the visible surface of the ceiling tile, formation of the pulp surface layer is critical. In the apparatus of the present invention, the layer is deposited in the trays in an uneven configuration with outer edges being thicker than inner portions of the layer. This uneven layer is formed with a curved edge on the bottom of the feeder box. A roller is then used to level the layer, providing it with a substantially uniform density and surface texture. The slabs are then hardened by baking. The hardened slabs are then cut and finished in accordance with known techniques. It should be noted that the by-products of finishing the slabs into tiles can be used and reclaimed by including them in subsequent batches of pulp.

BRIEF DESCRIPTION OF THE DRAWINGS

A more complete understanding of the invention will be obtained by reading the following specification, in conjunction with the attached drawings, wherein.

DETAILED DESCRIPTION OF THE INVENTION

Figure 1:
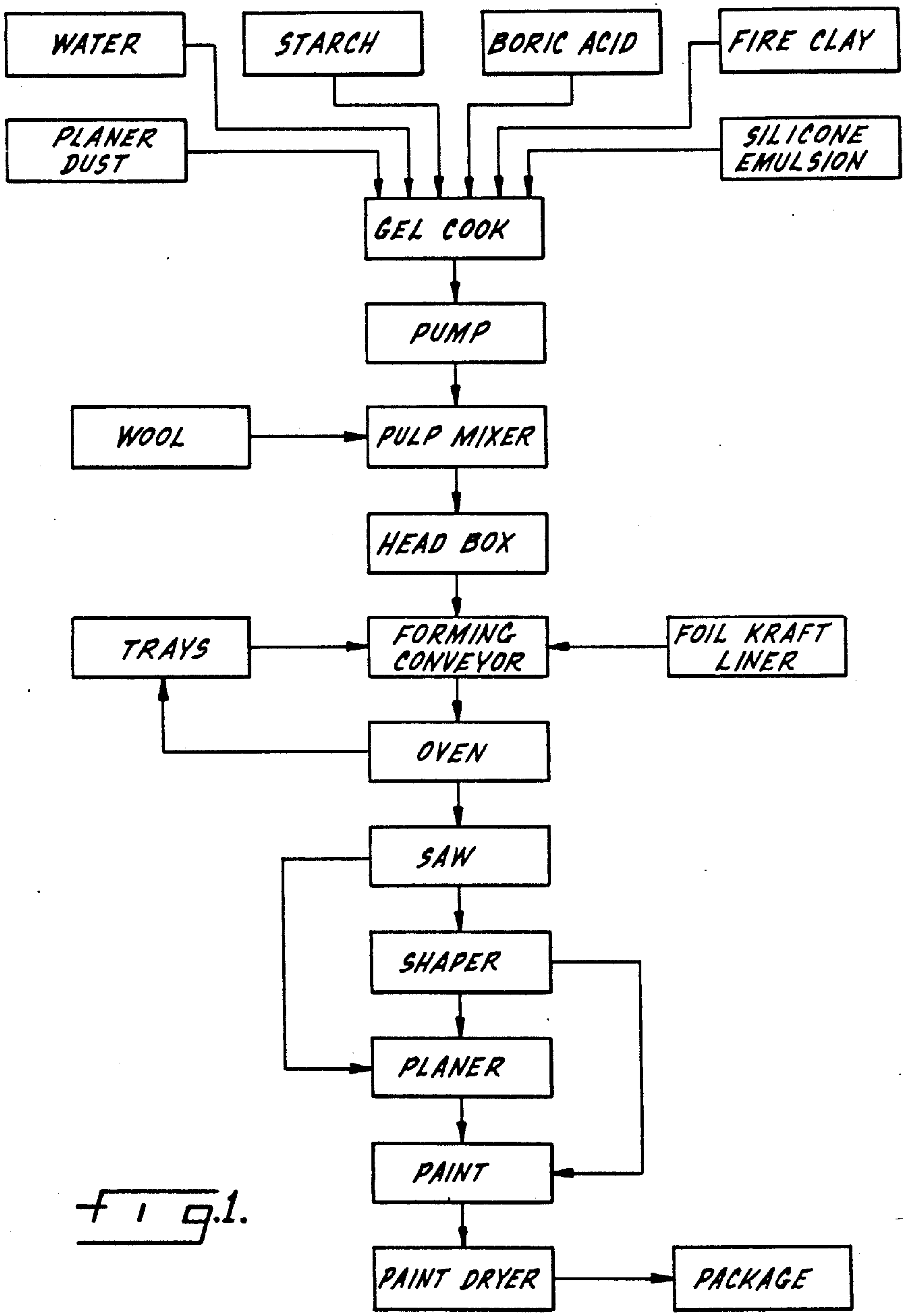
FIG. 1 is a block diagram showing the steps of the process used in the present invention.

FIG. 1 shows the several steps which are used in producing ceiling tiles in accordance with the present invention. Initially, water, preferably pre-heated, is placed in a mixing tank. Care should be taken not to use water which is hotter than 150° F. Starch, clay and boric acid are then stirred into the water to form a suspension. Planer dust from finishing operations of previously made tiles can subsequently be added and stirred into the mixture. The mixture is then heated to about 175° F., at which time a silicone emulsion should be added. (plus or minus 2° F.), with occasional stirring (at approximately 20 minute intervals), for about 2 hours. As the mixture reaches about 200° F., the starch in the mixture thickens into a gel, which can be held in the tank for several hours without significant detrimental effects.

Once the gelled mixture has been prepared, the mixture should be pumped into a mixer (such as one used to make mortar). Fibrous material can then be slowly added to form a pulp. The fibrous material used in the present invention is comprised of shredded fiber glass scrap. Depending upon the desired surface texture characteristics to be imparted to the tiles being made, plural shredding steps may be used to prepare the scrap fiber glass. Also, virgin fiber glass can also be used, instead of recycled scrap. When virgin fiber glass is used, the amount of silicone emulsion, particularly the oil content thereof, may need to be reduced to achieve an optimal product.

Once the pulp has been prepared and checked for proper slump, in a manner similar to ASTM C 143 for concrete, the pulp is ready to be formed into slabs. The slump may vary depending upon desired surface texture. Once a desired texture is achieved, slump tests can be used to achieve repeatability, as long as consistent slump test procedures are used. When a desired pulp consistency has been achieved, the pulp is poured through a screen with ½″ × ½″ square openings (or other shapes with approximate area of ¼ square inches) to eliminate large lumps which might interfere with or disrupt the slab forming operation. In the process, the following ranges of proportions of the foregoing components are recommended:

| COMPONENT | APPROXIMATE PERCENT BY WEIGHT |
|---|---|
| Water | about 80 to about 85 |
| Starch | about 2 to about 5 |
| Boric Acid | about 0.15 to about 0.35 |
| Fire Clay | about 0.7 to about 0.95 |
| Planer Dust | about 0 to about 8 |
| Silicone Emulsion | about 0 to about 0.1 |
| Fiber glass (scrap) | about 5 to about 15. |

An example of a successful mixture having proportions within the ranges described above had components as follows:

| COMPONENT | APPROXIMATE PERCENT BY WEIGHT |
|---|---|
| Water | about 82.75 |
| Starch | about 3.2 |
| Boric Acid | about 0.26 |
| Fire Clay | about 0.84 |
| Planer Dust | about 4.0 |
| Silicone Emulsion | about 0.05 |
| Fiber glass (scrap) | about 8.9 |

Figures 2, 3, 4:
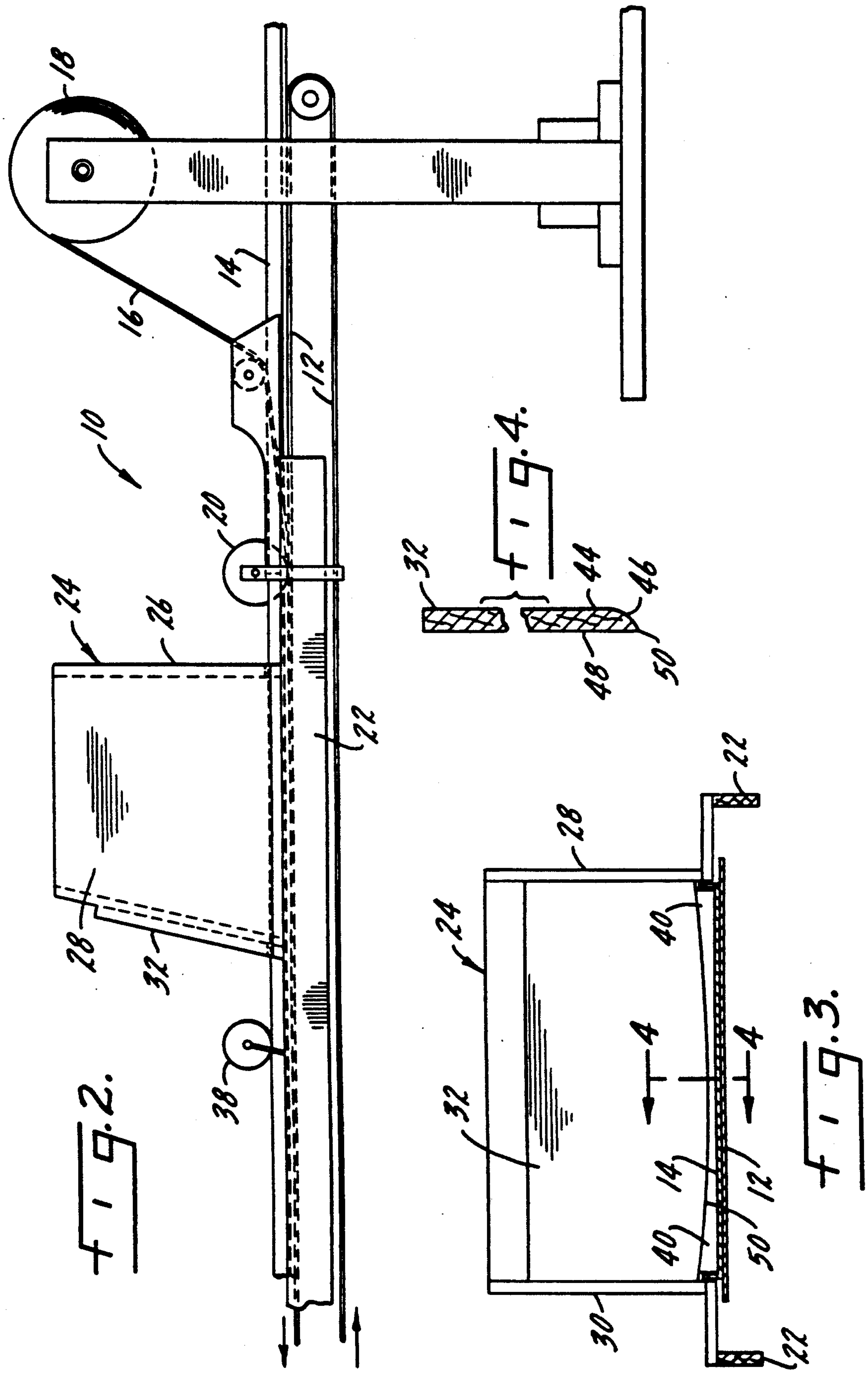
FIG. 2 is an elevational view of a conveyor and feeder box constructed in accordance with the present invention.
FIG. 3 is a front elevational view of the feeder box shown in FIG. 1.
FIG. 4 is a sectional view of the lower front edge of the feeder box shown in FIG. 3, taken along line 4—4 of FIG. 3.

FIG. 2 is an elevational view in partial section of the slab-forming apparatus of the present invention. As used in this application, the word "slab" is intended to refer to a layer of uncured pulp, which when cured may be cut into tiles. The apparatus 10 includes a conveyor belt 12 for carrying a tray 14 in a generally horizontal direction. Tile backing (paper, foil, or a combination thereof) 16 is fed from a roll 18 into the tray 14. A roller 20 presses the backing into the tray 14. The roller 20 is mounted to the conveyor support 22. The direction of movement of the conveyor belt 12 is shown with arrows in FIG. 1. The upper conveying section of the belt 12 moves the trays 14 to the left as viewed in FIG. 1. Trays 14 lined with backing 16 are moved by the conveyor belt 12 underneath a feeder box 24, which is carried by the support member 22. The feeder box 24 is open on both its top and bottom. The box 24 has three sides 26, 28 and 30 (see FIGS. 2 and 3) which are generally vertical. The fourth side 32 is at an angle relative to the movement of the conveyor belt 12. An aqueous mixture of cooked starch and fibrous material is placed in the feeder box 24. As the conveyor moves the trays under the feeder box, the pulp is deposited in the trays, and the lower edge 50 of the front 32 forms the upper surface of the pulp layer.

As can be seen clearly in FIG. 3, the lower edge 50 is curved so that outer edges of the pulp layer are thicker than the center or inner portion thereof. Referring again to FIG. 2, the texturizing roller 38 levels the layer by compressing the pulp which has been deposited in the outer edges 40 of the tray.

Because the pulp frictionally engages the sides 28 and 30 as it exits the box 24, separations in the pulp layer tend to occur at the outer edges. By depositing the pulp layer in the configuration shown in FIG. 2, and by subsequently rolling the pulp layer with the roller 38, a pulp layer which is substantially uniform in density and surface texture is produced.

FIG. 4 shows a section through the lower edge 50. Inner and outer surfaces, 44 and 48 respectively, of the front 32 converge at the bottom edge 50. The convergence arises because the inner surface 48 has a curved extension 46 which meets with the substantially straight outer surface 44. The curved extension 46, together with the lateral curvature thereof, shown in FIG. 2, provide the lower end of the front 32 with a compound curvature. Such compound curvature tends to produce a layer of pulp which when rolled with a roller 38 has excellent consistency of surface texture and density.

The positive rake angle provided by the sloping front 32 relative to the layer further enhances the consistency of the product produced by the present invention. The angle of the front 32, preferably between about 3° to about 15° from vertical, results in a slight compression of the pulp as it exits the bottom of the feeder box 24. In order to produce a consistent product using the feeder box of the present invention, it is important to maintain an approximately constant level of pulp in the box 24. The amount of hydrostatic pressure at the point of exit from the feeder box has a significant effect on the consistency of the pulp layer.

The forming operation is critical. The height of the lower edge 50, shown in FIG. 3, should be at an elevation which allows enough pulp to exit the box into the tray so that when the roller 38 rides across the pulp layer, the roller is completely supported by pulp, and not by the edges of the tray. By preventing interference between the roller 38 and the trays, the consistency of the pulp layer is better assured. Such interference may also be reduced by making the length of the roller slightly less than the distance between upward edges of the trays.

The inside of the feeder box 24 and the outside of the roller 38 may be sprayed with a release agent such as TRI-FLOW release agent made by Thomson & Formby, to prevent pulp from sticking to such components. The conveyor should never be stopped and should be run at a constant speed. The speed of the conveyor should be controlled with a variable controller and should be adjusted while observing slabs being formed so as to avoid creating large tears or fissures at the outer edges thereof. Once the trays are filled with pulp, they o should be handled carefully to avoid bumps which can cause changes in surface texture.

The filled trays are placed in ovens to cause the pulp to dry and harden. The following drying schedule was found to be effective:

1. raise to 250° F. in ½ hour
2. hold at 250° F. for 2 hours
3. increase to 375° F. in ½ hour
4. hold at 375° F. for 4 hours
5. reduce to 350° F. and hold for 2 hours
6. reduce to 325° F. and hold for 2 hours
7. reduce to 300° F. and hold for 2 hours
8. reduce to 250° F. and hold for 3 hours The above 16 hour cycle effectively dries the slabs without burning them. It should be noted that drying temperatures should never exceed 400° F., and dried slabs should not be stored at, or re-heated to, temperatures above 240° F.

After the slabs have dried, they are cut into tiles, painted and packaged, using known techniques. The byproducts of planing, edging and sawing may be collected and recycled.

In summary, the variables which control the output of the system of the present invention include the formulation used, the speed at which the conveyor moves the trays, the level of pulp in the feeder box, the height of the front edge 50, the height, weight and diameter of the roller 38, and handling and drying procedures. Other factors such as the kind of backing used, and the atmospheric conditions also effect the final product, but to a lesser extent than those outlined above. It must be recognized that, as with many manufacturing processes, a certain degree of skill must be developed in order to properly control the many variables which effect the end product.

While the invention as been described with respect to a particular embodiment, it should be recognized that many variations, modifications, and alternatives can be made to the described embodiment without departing from the spirit and scope of the appended claims.

I claim:

1. A process for manufacturing ceiling tiles comprising the steps of:
preparing a mixture which includes water, starch, boric acid and fire clay,
heating said mixture to form a gel,
shredding scrap fiber glass prior to its addition to said gel to form shredded fiber glass,
adding fibrous material comprising said shredded fiber glass to said gel to form a pulp,
wherein said pulp comprises the following components:

| COMPONENT | PER CENT BY WEIGHT |
|---|---|
| Water | about 80 to about 85 |
| Starch | about 2 to about 5 |
| Boric Acid | about 0.15 to about 0.35 |
| Fire Clay | about 0.7 to about 0.95 |
| Planer Dust | about 0 to about 8 |
| Silicone Emulsion | about 0 to about 0.1 |
| Scrap Fiber glass | about 5 to about 15 |

feeding said pulp into trays to form slabs,
drying said slabs in an oven to form dried slabs in accordance with a temperature schedule as follows:
a. raise to about 250° F. in about ½ hour
b. hold at about 250° F. for about 2 hours
c. hold at about 275° F. in about ½ hour
d. hold at about 375° F. for about 4 hours
e. reduce to about 350° F. and hold for about 2 hours
f. reduce to about 325° F. and hold for about 2 hours
g. reduce to about 300° F. and hold for about 2 hours
h. reduce to about 250° F. and hold for about 3 hours, and
finishing said dried slabs to form said ceiling tiles.

2. A process for manufacturing ceiling tiles in accordance with claim 1 wherein:
said fiber glass is shredded a plurality of times prior to its addition to said gel.

3. A process for manufacturing ceiling tiles in accordance with claim 1 wherein:
prior to feeding said pulp into said trays, said pulp is passed through a screen.

4. A process for manufacturing ceiling tiles in accordance with claim 3 wherein:
said screen has openings no greater than about 174 square inch in area.

5. A process for manufacturing ceiling tiles in accordance with claim 1 wherein:
said mixture is heated to a temperature of about 200° F., and held thereat for about 2 hours.

6. A process for manufacturing ceiling tiles in accordance with claim 1 wherein:
said step of preparing a mixture includes adding a silicone emulsion and planer dust in addition to said water, starch, boric acid and fire clay.

* * * * *